Sept. 12, 1961 R. P. PINI 2,999,633
CALCULATING RULE
Filed Dec. 27, 1956
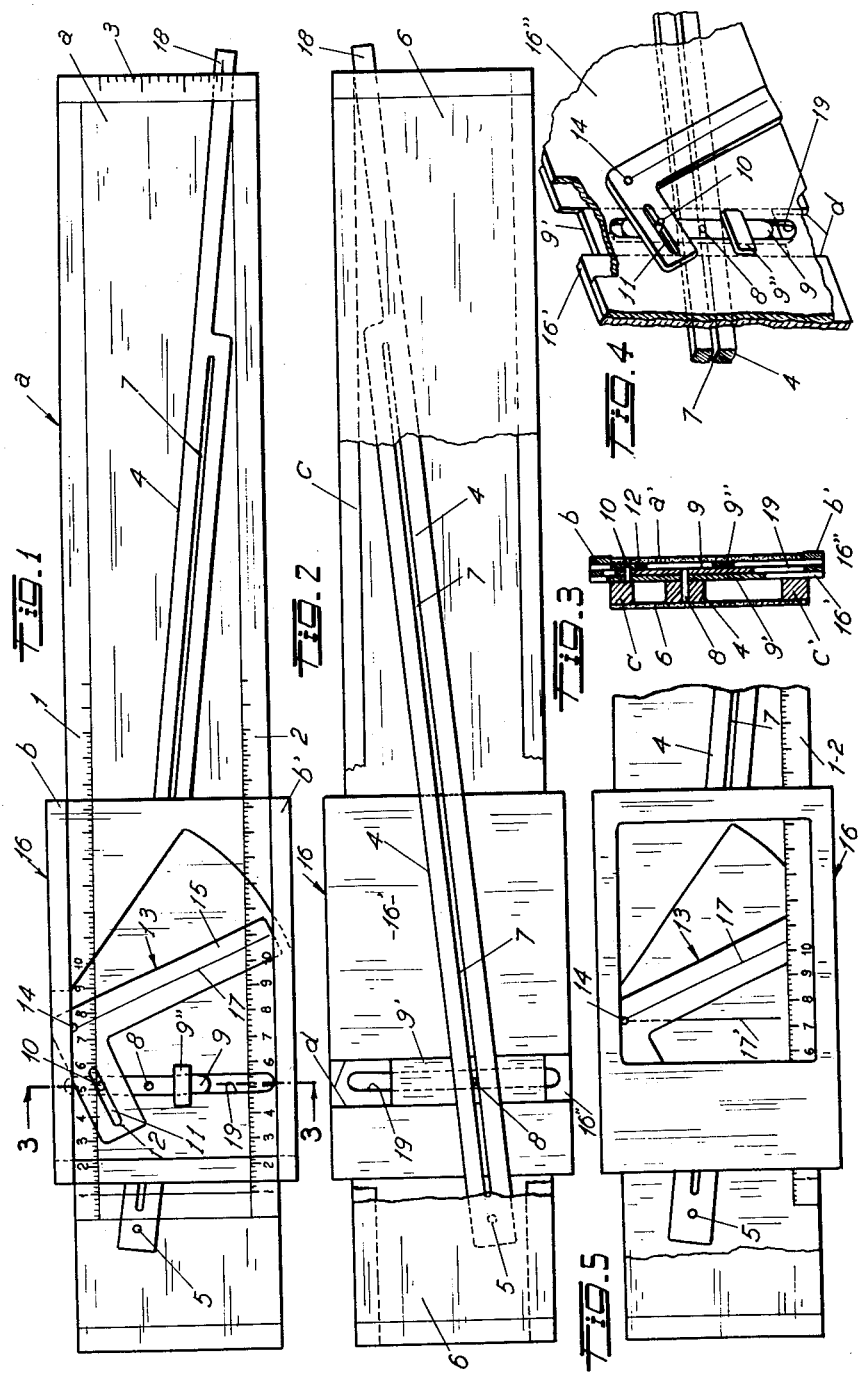

United States Patent Office 2,999,633
Patented Sept. 12, 1961

2,999,633
CALCULATING RULE
Roy Pio Pini, Via Giacomo Leopardi 6, Bollate, Milan, Italy
Filed Dec. 27, 1956, Ser. No. 630,946
Claims priority, application Italy Dec. 28, 1955
2 Claims. (Cl. 235—61)

This invention relates to slide rules.

The present invention has as an object the provision of a slide rule for calculating for cast, stamped or machined articles either their relative dimensions or the dimensions of the mold, or the percentage of shrinkage, two of these variables being known.

With particular reference to ceramic, earthenware or porcelain obtained by casting, by stamping or machine-shaped, it is known that they are subject to shrinkage with respect to the original dimensions of their respective molds.

Sometimes the dimensions of a finished article to be obtained from material having a known shrinkage are fixed, and in such a case the mold dimensions can be calculated. At other times, given a material of which the shrinkage is unknown, a finished object is made with a mold of given dimensions and then it is possible to calculate the shrinkage. Further, with a material having known shrinkage and with a given mold, the dimensions of the piece can be determined.

The present invention proposes to solve the three said problems in such a way as to obviate the inconvenience and uncertainty of conventionally laborious and long calculations by providing a slide rule useful for such calculations. This new slide rule is characterized by an elongated, rectilinear body having on a front transparent face a first scale for the dimensions of the object, a second scale for the mold dimensions, a third scale of shrinkage percentages, and an index means movable with respect to the said body and interconnected by slidable articulated members in such a manner that by setting two of such index means to the two known values upon two of the said scales, it will be possible to read on the third of the said scales at the third index means the value of the third variable or unknown quantity.

In one embodiment of a slide rule according to the present invention, the rule may comprise but two scales of which one measures the shrinkage percentage and the other allows reading either the dimension of the mold or the dimension of the finished piece. The slide rule according to the present invention lends itself to various forms, two of which will next be described by way of example and illustrated in the appended drawing in which:

FIG. 1 is a schematic front view of a first embodiment of the invention;

FIG. 2 is a back view of the slide rule of FIG. 1;

FIG. 3 is a cross-sectional view according to line 3—3 of FIG. 1;

FIG. 4 is a perspective view on an enlarged scale of a detail of the slide rule; and FIG. 5 shows a second form of slide rule with the scales relative to the finished piece and to the mold arranged together.

In FIGS. 1–4 the slide rule includes a body $a$ which has on its front face, constituted by a transparent plate $a'$, the scales, 1 for the measuring piece, 2 for the measuring of the mold, and 3 for the measuring of the shrinkage percentage. The slide rule is provided with a bar 4 pivoted on pin 5 to the rear wall 6 of the body $a$ of the rule. The rear wall 6 is solidly connected with the horizontal splines $c$ and $c'$ of the rule $a$. The body $a$ comprises at the front, as aforesaid, its front face $a'$ (a transparent plate) that is solidly connected with the rectangular body $a$ only at the edges of the latter but at a certain distance from the said splines $c$ and $c'$, so that between them and the face $a'$ exists a space in which the rule slide 16 can move horizontally. The rule slide 16 slides between $a$ and $a'$ guided by its own splines $b$ and $b'$ which are slidable over $a'$ (see FIG. 3). The bar 4 located between the wall 6 and the slide 16 carries a longitudinal slot 7 in which is seated and slides the pin 8 projecting from a spine 9, which spline can slide vertically in a slot 19 formed in the element 16' of the slide 16 (see FIGS. 2 and 4).

The spline 9 is vertically movable in the guide $d$ provided in the element 16' of the slide 16 (see FIGS. 1 and 4) and is thus guided by the plate 9' and comprises in front a retaining plate 9" so that the spline 9 can slide in guide $d$ without coming out of it. The spline 9 is provided in front with a second pin 10 engaging in the slot 11 of one of the arms 12 of a bell crank 13 fulcrumed at 14 to the element 16" of the slide 16, and the arm 15 which is provided with an indicating line or index 17 which, in the rest position of the slide 16, is oriented vertically to the two scales 1 and 2 and coincides with the point of origin of the said two scale.

The bar 4 terminates with the index 18 for the third scale 3. Should it be desired to reduce to two the aforementioned scales, according to the variant illustrated in FIG. 5 it will suffice to omit the scale 1. The lower scale 1—2 (see FIG. 5) assumes the function of scales 1 and 2 in FIGS. 1–4 without requiring a change in the position of fulcrum 14 on the slide 16. There is, however, provided upon element 16" of the slide 16 another indicating line or vertical index 17' passing by the fulcrum 14 and carried by the said slide 16. In accordance with the invention elements 16' and 16" of slide 16 can be formed as a single element.

The following example illustrates the use of the present slide rule.

Knowing, for instance, that a 125 mm. high finished object is desired and the shrinkage percentage is 15%, it is desired to know what height the mold is to have.

To this end the slide 16 is brought to the origin of the scale so that the index 17 of the bell crank 13 indicates zero. The index 17 is then displaced until it indicates the 15% shrinkage percentage (known), then the slide 16 is moved until the fulcrum 14 of the bell crank 13 is set at the value 125 mm. (desired height of the piece) on the scale 1. During this operation the pin 8 will be displaced downwards, the spline 9 following the slot 19 of the slide 16. The pin 10 will then slide in the slot 14 of the arm 12 of the bell crank 13 rotating it around its fulcrum 14. The position of the index 17 relative to the second scale for the new position of rest of the bell crank 13 gives the height of the mold, i.e. about 147 mm. on the scale 2.

In the case of a single scale (see FIG. 5) for determining both the dimensions of the mold and of the finished object, the index 18 of the bar 4 is placed on the 15% value of shrinkage and slide 16 is moved until index 17' indicates the value to be given the finished object. Then, index 17 indicates on the same scale (1—2) the value to be assigned to the mold.

Another problem, for example, might be:

Given the value of about 147 mm. for the mold and the value of the shrinkage percentage as 15%, find the value of the finished piece.

The index 18 is displaced along the scale 3 of the percentages to be value 15% and then the slide 16 is displaced until the index 17 indicates 147 mm. on the scale 2. At the fulcrum of the bell crank 13 there will be read upon the scale 1, 125 mm. corresponding to the height that the finished piece will assume. In case it should be desired to employ a slide rule with but one scale, the value of the finished object would be read at the vertical index 17' passing through the fulcrum 14 of the bell crank 13 (FIG. 5).

The third type of problem is to determine the shrinkage percentage, the height of the mold and the height of the finished piece being known.

The fulcrum 14 of the lever 13 is set at the value corresponding to the finished object (in such a way that the vertical index passing through the fulcrum indicates upon the scale the value of the finished object in the case of a slide rule having a single scale) and the index 18 is displaced until the index 17 indicates the number corresponding to the mold dimension. The value at which the index 18 stops represents the shrinkage percentage. The slide rule might even have corresponding centimeter and inch scales.

Other constructional variations are obviously possible within the scope of the invention.

From the above it is seen that the slide rule of the invention is capable of ready, rapid and precise use and is very useful in the manufacture of ceramics.

What is claimed is:

1. A slide rule for relating variables such as material shrinkage, mold size and finished article size, comprising an elongated body having a first linear scale indicating dimensions for the finished article, a second linear scale parallel to the first scale for indicating mold dimensions, and a third scale of shrinkage percentages arranged transversely of the first and second scales, a slide slidable on said elongated body along said first and second scales, a bell crank lever having first and second arms respectively provided with an index and a slot, a pivot pivotally supporting said lever on said slide, a spline slidably supported on said slide for movement transversely of said first and second scales and including a pin engaged in the slot in said second arm, a second pin on said spline, and a bar pivoted to said elongated body and having a slot slidably engaging said second pin, said bar having an index for indicating a percentage on the third scale, the pivot for said bell crank indicating a dimension on one of the first two said scales and the index on said first arm indicating a dimension on the other of the latter scales whereby due to the pivoting of said lever and movement of said spline selection of two of the variable indicates the third of the variables.

2. A rule as claimed in claim 1 wherein the first and second scales coincide on said elongated body.

References Cited in the file of this patent

UNITED STATES PATENTS

| | | |
|---|---|---|
| 1,279,829 | Bell | Sept. 24, 1918 |
| 1,438,498 | Kinzler | Dec. 12, 1922 |
| 2,555,453 | Mennie | June 5, 1951 |

UNITED STATES PATENT OFFICE

CERTIFICATE OF CORRECTION

Patent No. 2,999,633                      September 12, 1961

Pio Pini

It is hereby certified that error appears in the above numbered patent requiring correction and that the said Letters Patent should read as corrected below.

In the grant, lines 1 and 12, and in the heading to the printed specification, line 3, name of inventor, for "Roy Pio Pini", each occurrence, read -- Pio Pini --; in the heading to the sheet of drawings for "R. P. Pini" read -- P. Pini --.

Signed and sealed this 6th day of March 1962.

(SEAL)
Attest:

ERNEST W. SWIDER
Attesting Officer

DAVID L. LADD
Commissioner of Patents